United States Patent
Sathyanarayana Murthy

(10) Patent No.: US 10,796,182 B2
(45) Date of Patent: Oct. 6, 2020

(54) INTERACTIVE OPTICAL CODES

(71) Applicant: HEWLETT PACKARD ENTERPRISE DEVELOPMENT LP, Houston, TX (US)

(72) Inventor: Harish Kolar Sathyanarayana Murthy, Bangalore (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 252 days.

(21) Appl. No.: 15/951,166

(22) Filed: Apr. 11, 2018

(65) Prior Publication Data

US 2019/0318185 A1 Oct. 17, 2019

Related U.S. Application Data

(63) Continuation of application No. 15/031,473, filed as application No. PCT/US2013/066089 on Oct. 22, 2013, now Pat. No. 9,971,950.

(51) Int. Cl.
*G06K 9/18* (2006.01)
*G06K 19/06* (2006.01)
*G06K 7/14* (2006.01)
*G06K 9/00* (2006.01)
(Continued)

(52) U.S. Cl.
CPC .............. *G06K 9/18* (2013.01); *G06F 40/12* (2020.01); *G06K 7/1413* (2013.01); *G06K 7/1417* (2013.01); *G06K 9/00402* (2013.01); *G06K 9/2063* (2013.01); *G06K 19/06028* (2013.01); *G06K 19/06037* (2013.01); *G06K 2209/01* (2013.01)

(58) Field of Classification Search
CPC .. G06K 9/18; G06K 9/00402; G06K 9/06037; G06K 19/06028; G06K 19/06037; G06K 7/1413; G06K 7/1417; G06F 40/12; G06Q 20/3274
USPC ......................................................... 382/187
See application file for complete search history.

(56) References Cited

U.S. PATENT DOCUMENTS

| 8,807,434 B1 * | 8/2014 | Windmueller ... G06K 19/06037 235/462.09 |
| 2002/0126780 A1 * | 9/2002 | Oshima ................ G06Q 20/045 375/347 |

(Continued)

FOREIGN PATENT DOCUMENTS

| CN | 1434957 A | 8/2003 |
| CN | 101859398 A | 10/2010 |

(Continued)

OTHER PUBLICATIONS

"OCR Web Service—SOAP and REST Cloud API," Copyright 2009-2018, http://www.ocrwebservice.com/.

(Continued)

*Primary Examiner* — Ali Bayat
(74) *Attorney, Agent, or Firm* — Hewlett Packard Enterprise Patent Department

(57) ABSTRACT

Optical codes can include scanning an optical code and a character surrounding the optical code with a computer. A uniform resource locator can be extracted from the optical code. The uniform resource locator can be modified by associating the character surrounding the optical code with the URL extracted from the optical code.

19 Claims, 3 Drawing Sheets

(51) Int. Cl.
*G06K 9/20* (2006.01)
*G06F 40/12* (2020.01)

(56) References Cited

U.S. PATENT DOCUMENTS

| | | | |
|---|---|---|---|
| 2005/0089017 A1* | 4/2005 | Fukada | G06F 16/9562 370/351 |
| 2012/0132701 A1* | 5/2012 | Nakagawa | G06K 17/0022 235/375 |
| 2012/0169928 A1 | 7/2012 | Casagrande et al. | |
| 2012/0209749 A1 | 8/2012 | Hammad et al. | |
| 2013/0037608 A1* | 2/2013 | Evevsky | G06F 21/31 235/380 |
| 2013/0043302 A1 | 2/2013 | Powlen et al. | |
| 2013/0074191 A1 | 3/2013 | Ben-Reuven | |
| 2013/0112760 A1 | 5/2013 | Schory et al. | |
| 2013/0134213 A1 | 5/2013 | Pallakoff et al. | |
| 2013/0191229 A1 | 7/2013 | Rodgers et al. | |
| 2013/0193201 A1 | 8/2013 | Bradley et al. | |
| 2015/0008256 A1* | 1/2015 | Beadles | G06F 16/9554 235/375 |
| 2015/0008257 A1 | 1/2015 | Beadies | |
| 2015/0317060 A1* | 11/2015 | Debets | G06F 3/0482 715/835 |
| 2016/0196484 A1 | 7/2016 | Ciavatta | |

FOREIGN PATENT DOCUMENTS

| | | |
|---|---|---|
| CN | 103247229 A | 8/2013 |
| EP | 3061034 A1 | 8/2016 |
| WO | WO-2006049430 | 5/2006 |
| WO | WO-2007107533 | 9/2007 |
| WO | WO-2012168942 | 12/2012 |
| WO | 2015/060821 A1 | 4/2015 |

OTHER PUBLICATIONS

"QR Code Generation API: Easy to Use & Seamless to Integrate", Retrieved from https://www.unitaglive.com/api/qrcode, 2010, 3 pages.
EPO, Extended EP Search Report, dated Jun. 1, 2017, Application No. 13896139.6, 9 pages.
http://www.freelancer.com/projects/Mobile-Phone-iPhone/code-with-handwritten-number-recognition.html,Freelancer Technology Pty Limited (ACN 142 189 759)Copyright 2013.
ISR/WO PCT/US2013/066089, HP reference 83668201, Jul. 17, 2014, 9 pps.
Official ZXing ("Zebra Crossing") project home, http://www.oss.io/p/zxing/zxing, Retrieved Apr. 11, 2018, 5 pages
Schottmuller, et al., "10 Ways to Use QR Codes for Better Conversion Rates", unbounce, 2010, 34 pages.
Steven Suehring, "Chapter 2: Creating and Using a Web Service", In: "PHP, MySQL, JavaScript & HTML5 All-in-One for Dummies", Apr. 1, 2013, Wiley, XP55373506, pp. 541-553.

* cited by examiner

INTERACTIVE OPTICAL CODES

BACKGROUND

An optical code can be an optical machine-readable representation of information. In some examples, optical codes can be attached to an object and can include information associated with the object and/or can be placed in an advertisement and include information associated with a product and/or a service. A user can scan the optical code with a smart phone (e.g., optical code reader) and can be provided the information associated with the product and/or the service. For example, upon scanning the optical code, the smart phone can be directed to a general product web page and/or a general weather service web page.

DETAILED DESCRIPTION

Optical codes can contain information associated with a product and/or service. In some examples, optical codes can contain a uniform resource locator (URL), which can be used to provide a user with information about a product and/or a service. Inclusion of URLs into optical codes has become increasingly popular as many people have smart phones which can include functionality for scanning an optical code. For instance, a user can scan an optical code placed on an object and/or advertisement that includes a URL with their smartphone and be directed to a product information web page and/or a page associated with a service.

In some examples, an advertisement can contain an optical code that includes information associated with products advertised in the advertisement. Upon scanning the optical code with a smartphone, a web browser on the smartphone can be directed to a webpage that is a general product page. For example, if a user is interested in mobile electronics and they scan an optical code that includes a URL for consumer electronics, the user can be taken to a web page associated with consumer electronics. The user can then navigate to a particular subset of the consumer electronics web page to find the mobile electronics.

Alternatively, in some examples, an optical code may be scanned to direct a user to a web site where they can enter personal information so a customer service representative can contact them. The user can scan the optical code and can be directed to a web site where they can enter their personal information (e.g., telephone number) so the customer service representative can contact them.

In addition, an optical code can be scanned to direct a user to a web page that provides a service to the user, such as a weather service web page. In some examples, an optical code can be included in a local newspaper and can be scanned by a user's smart phone and can direct a web browser to a web page associated with a weather forecast. For the user to view a weather forecast associated with a particular location, the user can enter a location (e.g., zip code, city) into a field presented on the web page.

In contrast, examples of the present disclosure can include scanning an optical code and a character surrounding the optical code with a computing device. Examples of the present disclosure can include extracting a URL from the optical code. Examples of the present disclosure can include modifying the URL by associating the character surrounding the optical code with the URL extracted from the optical code.

Figure 1:
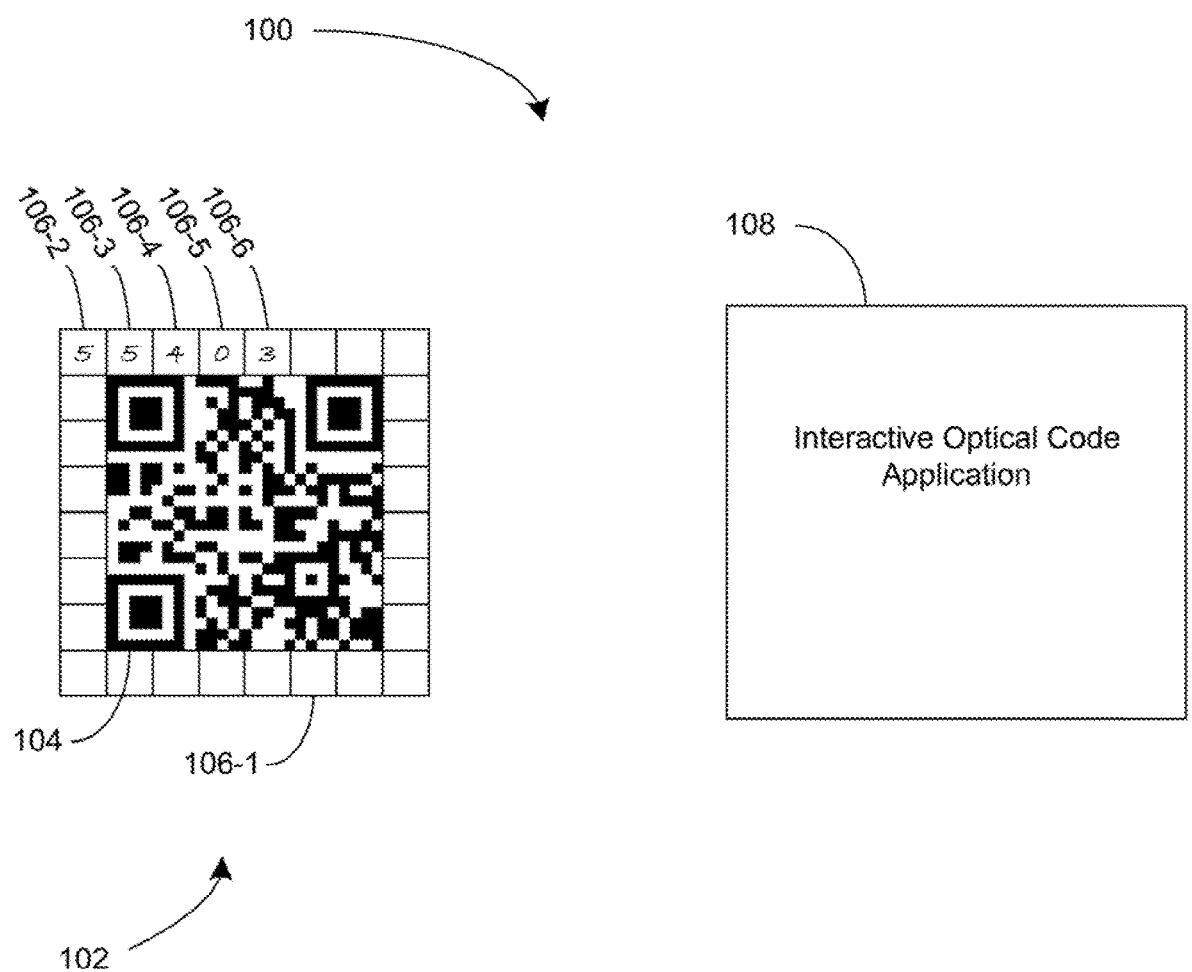
FIG. 1 illustrates an environment for providing interactive optical codes according to the present disclosure.

FIG. 1 illustrates an environment 100 for providing an interactive optical code according to the present disclosure. The environment 100 can include an interactive optical code 102 and an interactive optical code application 108. As discussed herein, the interactive optical code 102 can be defined as an optical machine-readable representation of information in which a portion of the information can be changed. For example, the interactive optical code 102 can include an optical code 104 and an interactive portion 106-1, 106-2, 106-3, 106-4, 106-5, 106-6, hereinafter generally referred to as interactive portion 106. The interactive portion 106 can be made interactive by allowing a user to write information in the interactive portion 106, which can surround the optical code 104.

The optical code can be for example, a 1-Dimensional (1-D) and/or 2-dimensional (2-D) optical code (e.g., barcode, quick response code), although examples are not so limited. 1-D optical codes can be defined as an optical code having varying widths and spacing of lines. 2-D optical codes can be defined as an optical code having geometric patterns, for example, dots, squares, hexagons, and/or rectangles. Both 1-D and 2-D optical codes can include a representation of information, although a 2-D optical code can contain more information than a 1-D optical code, depending on the geometric patterns contained in the 2-D optical code.

The interactive portion 106 of the interactive optical code 102 can contain an area where content can be entered by a user. The content can include characters that can be handwritten by a user and can be representative of information that can be associated with the information represented in the optical code 104. In some examples, the content can include symbols and/or alphanumeric characters, although examples are not so limited. By varying the content in the interactive portion 106 of the interactive optical code 102, varying types of information can be associated with the information represented in the optical code 104.

In some examples, the interactive optical code application 108, hereinafter generally referred to as application 108 can include instructions that are executable by a computing device (e.g., smart phone). The application 108 can include instructions to capture an image of the optical code 104 and the interactive portion 106. The image of the optical code 104 and the interactive portion 106 can include a plurality of handwritten characters in the interactive portions 106-2, 106-3, . . . , 106-6. A decoder, which can be a device used for decoding information contained in an optical code can be used to decode the optical code 104 and optical character recognition can be used to determine what characters are included in the plurality of handwritten characters in the interactive portions 106-2, 106-3, . . . , 106-6 listed by the user in the interactive portion 106. The information contained in the optical code 104 can then be associated with the content in the interactive portion 106.

In some examples, the information included in the optical code 104 can be a uniform resource locator (URL). As discussed herein, the optical code 104 can include a URL associated with a general product webpage advertised in an advertisement. In previous methods, a user could scan the optical code 104 with a smartphone and a web browser running on the smartphone could be directed to open a webpage that is a general product page. The user could then navigate through a user interface to a webpage associated with a particular product that they are interested in from the general product page. In some examples it can be difficult to navigate to a web page when the user interface is small, such as a user interface associated with a smartphone.

In contrast, examples of the present disclosure can direct the web browser running on the smartphone to a particular product webpage that the user is interested in, rather than the general product page. In some examples, a user can enter a description of the particular product in which they are interested in the interactive portion 106. Optical character recognition can then be used to determine the characters that have been entered into the interactive portion 106. The characters can be combined with the URL from the optical code 104 to create a URL that is associated with the particular product and/or particular web page that the user is interested in.

Alternatively, the optical code 104 can be scanned with a smart phone to direct a user to a web site where they can enter personal information so a customer service representative can contact them. The user can then scan the optical code 104 and can be directed to a web site where they can enter their personal information (e.g., telephone number) so the customer service representative can contact them, which again can be complicated due to a size of the user interface.

In contrast, examples of the present disclosure can allow an individual to enter their personal information into the interactive portion 106. The characters entered into the interactive portion 106 can then be determined through optical character recognition (OCR) and can be associated with the URL in the optical code 104. The personal information can then be automatically entered into the webpage associated with the URL.

In addition, in some previous methods, the optical code 104 can be scanned with a smart phone to direct a user to a general service page, such as a weather service page. The user can then enter location information into a field included in the webpage to receive a forecast associated with the location information, which can be associated with difficulties depending on a size of the user interface.

In contrast, examples of the present disclosure can allow an individual to enter location information (e.g., zip code, city, state) into the interactive portion 106. The characters entered into the interactive portion 106 can then be determined through OCR and can be associated with the URL in the optical code 104. A web browser associated with the smartphone can then be directed to open a webpage that includes weather information for the location entered by the user.

As discussed herein, an image of the optical code 104 and a plurality of handwritten characters in the interactive portions 106-2, 106-3, . . . , 106-6 included in the interactive portion 106 surrounding the optical code can be captured by a camera. The camera can be in communication with a computing device (e.g., smart phone) that is running the application 108. In some examples, the application 108 can include instructions to access the camera in communication with the computing device to capture the image.

Upon capturing the image of the optical code 104 and the plurality of handwritten characters in the interactive portions 106-2, 106-3, . . . , 106-6 surrounding the optical code 104, information can be extracted from the optical code 104, which can include a URL. The URL can be for a web page associated with a product and/or service. In some examples, the URL can be for a general landing page of a web site. In some examples, the general landing page can be for a general product page, such as a general product page for consumer electronics. Alternatively, the general landing page can be for a general service page, such as a landing page of a weather service web site that includes a field for entering a location; a landing page of a web site that includes a field for a user to enter their personal information so a representative can contact them; and/or a landing page of a web site that includes a field for a user to enter their height and weight to determine their body mass index, in some examples.

The information can be extracted from the optical code 104 using an optical code processing library. The processing library can be included in the application 108 and/or can be remote from the application 108 and/or the computing device running the application 108. In some examples, the optical code processing library can be an open source, multi format 1-D and/or 2-D image processing library implemented in Java, such as ZXing.

The image captured by the camera can also include the plurality of handwritten characters. To identify text represented by the plurality of handwritten characters, OCR can be used to identify a character represented by each of the plurality of handwritten characters. OCR can be performed by the application, by the computer running the application, and/or by a remote service.

In some examples, the interactive portion 106 can be divided into a plurality of cells where characters can be entered. As shown in FIG. 1, the interactive portion 106 can be divided into a plurality of interactive boxes and each of the plurality of characters can be entered into a corresponding one of the plurality of interactive boxes. For example, the number "5" can be entered into interactive portions 106-2, 106-3, the number "4" can be entered into interactive portion 106-4, the number "0" can be entered into interactive portion 106-5, and the number "3" can be entered into interactive portion 106-6. The plurality of cells can surround a portion of a side of the optical code 104, or as shown in FIG. 1, the plurality of cells can surround the entire optical code 104.

Alternatively, the interactive portion 106 may not be divided into cells. For example, a single line may surround the optical code 104 and characters can be entered into the space between the single line and the optical code 104. Alternatively, no line may surround the optical code 104 and characters can be entered proximate to the optical code 104.

The character represented by each of the plurality of handwritten characters can be posted to the URL included in the optical code 104 to create a posted URL. In some examples, the character represented by each of the plurality of handwritten characters can be sent as a representation of new data to a server responsible for opening a web page associated with the URL. The representation of the new data can be stored as a subordinate of a resource identified by the URL. For example, the URL http://www.genericwebsite-weather.com/Local/ can be a URL for a weather web page (e.g., genericwebsite-weather.com) and when opened can display a web page where a location can be selected for a particular forecast.

The character represented by each of the plurality of handwritten characters can be stored as a subordinate of the resource identified by the URL. For example, the characters can be used to generate a more specific URL. In some examples, where a user enters a location (e.g., zip code) into the interactive portion 106 associated with the optical code 104 that includes the URL, the handwritten characters can be identified by OCR and the identified characters can be used to open a web page that is specific to content represented by the plurality of handwritten characters. The web page that is specific to content represented by the plurality of handwritten characters can be a web page that provides a forecast associated with the location entered by the user into the interactive portion 106. As such, the user can avoid having to select a location and/or having to enter a location on a web page associated with the URL in the optical code 104.

In examples of the present disclosure, various types of information can be entered into the interactive portion 106. As discussed herein, when the URL is for a general landing page of a web site, the type of information entered into the interactive portion 106 can be information associated with a particular portion of the web site. For example, where the general landing page provides an introduction to a company, the particular portion of the web site may provide information on a particular product. The information entered into the interactive portion 106 can then be, for example, a name of the particular product associated with the particular portion of the web site.

When the URL is for a landing page of a web site that includes a field for the user to enter their personal information (e.g., so a representative can contact them), the information entered into the interactive portion 106 can include contact information associated with the person. The information can include the user's telephone number, email address, physical mailing address, name, age, etc. The contact information can then be posted to the URL from the optical code 104 to create a posted URL. In some examples, the contact information can be entered into fields in a web page based on the contact information that has been posted to the URL. This may provide an opportunity for a user to confirm that the OCR has properly identified the character represented by each of the plurality of handwritten characters. Upon review of the contact information entered into the fields, the user can make a selection to submit the contact information such that the representative can contact them. Alternatively, upon creating the posted URL, the user's contact information can be directly submitted such that the representative can contact them. In some examples, a confirmation page can be presented to the user to confirm that their contact information was submitted.

Alternatively, other information can be entered into the interactive portion 106. In some examples, symbols and/or alphanumeric characters can be entered into the interactive portion 106 to rate an item, such as an article, product, service, etc. The interactive optical code 102 can be placed at an end of an article, on product packaging, on a flyer advertising a service, etc. Symbols and/or alphanumeric characters (e.g., 1 to 10, with 10 being the best) can be entered into each interactive portion, for example, to rate content, clarity, grammar, and/or articulation associated with an article. Alternatively, when the interactive optical code 102 is associated with a product or service, the symbols and/or alphanumeric characters can be entered to rate a quality of the product and/or service, in some examples.

In examples of the present disclosure, an indicator can be associated with each of the interactive portions 106 that indicates what is being rated. For example, an indicator may indicate that interactive portion 106-2 is associated with a content of an article, interactive portion 106-3 is associated with a clarity of the article, interactive portion 106-4 is associated with a grammar of the article, interactive portion 106-5 is associated with an articulation associated with the article, etc.

In examples of the present disclosure, multiple sets of information can be represented in the interactive portion 106 by a plurality of characters. The multiple sets of information can be different from one another. In some examples, different groups of characters can represent different information, such as different numbers associated with ratings of an article. Alternatively, a first group of characters can represent a zip code associated with a location and a second group of characters can represent a name of a city associated with the zip code, which can be used in obtaining weather information, in some examples. In some examples, a first group of characters can represent a zip code and/or name of a first city and a second group of characters can represent a zip code and/or name of a second city. As such, a weather forecast for both cities can be obtained.

Alternatively, a first group of characters can represent a weight of a person and a second group of characters can represent a height of a person, which can be used in obtaining a body mass index for the person. In examples of the present disclosure, a delimiter can be placed between characters and/or groups of characters. The delimiter can be placed between two zip codes, the weight and height of the person, and/or between two cities, in some examples, such that the characters and/or groups of characters can be distinguished. In some examples, the delimiter can include a space and/or symbol such as an asterisk, dash, etc.

Figure 2:
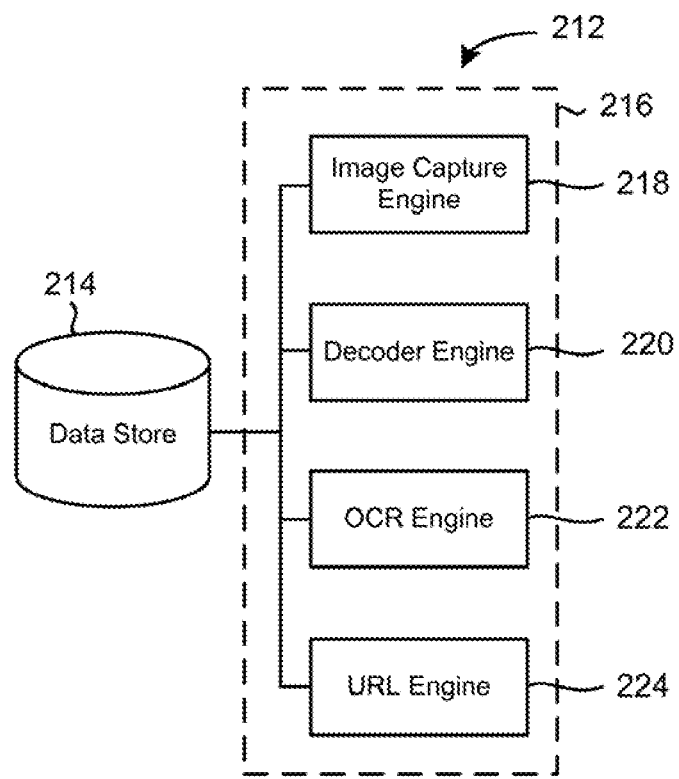
FIG. 2 illustrates a diagram of an example of a system for providing interactive optical codes according to the present disclosure.

FIG. 2 illustrates a diagram of an example of a system 212 for providing interactive optical codes according to the present disclosure. The system 212 can include a data store 214, a providing system 216, and/or a number of engines. The system 212 can be in communication with the data store 214. In some examples, the providing system 216 can include a number of engines (e.g., image capture engine 218, decoder engine 220, OCR engine 222, URL engine 224, etc.). The providing system 216 can include additional or fewer engines than illustrated to perform the various functions.

The image capture engine 218 can include hardware and/or a combination of hardware and programming to capture an image of an optical code and a plurality of handwritten characters surrounding the optical code. In some examples, the optical code can be a 1-D and/or 2-D optical code and can include a URL associated with a web site. The plurality of handwritten characters surrounding the optical code can be written by a user and can contain information associated with a particular portion of the web site, as discussed herein.

The decoder engine 220 can include hardware and/or a combination of hardware and programming to extract the URL from the optical code. In some examples, the URL can be extracted using an optical code processing library. Upon obtaining an image of the optical code, the optical code processing library can be searched for information associated with the optical code (e.g. a URL).

The OCR engine 222 can include hardware and/or a combination of hardware and programming to identify a character represented by each of the plurality of handwritten characters. Upon identification of the character represented by each of the plurality of handwritten characters, in some examples, the identified character can be displayed to a user for confirmation that OCR has correctly identified the handwritten characters. If OCR has not correctly identified the handwritten characters, the user can select an option to edit a particular one of the characters that has not been correctly identified.

The URL engine 224 can include hardware and/or a combination of hardware and programming to post the character represented by each of the plurality of handwritten characters to the URL from the optical code to create a posted URL. Examples of the present disclosure can include opening a web page using the posted URL that is specific to a content represented by the plurality of handwritten characters. In some examples, the web page can be for the particular portion of the web site that is associated with the handwritten characters surrounding the optical code written by the user.

Figure 3:
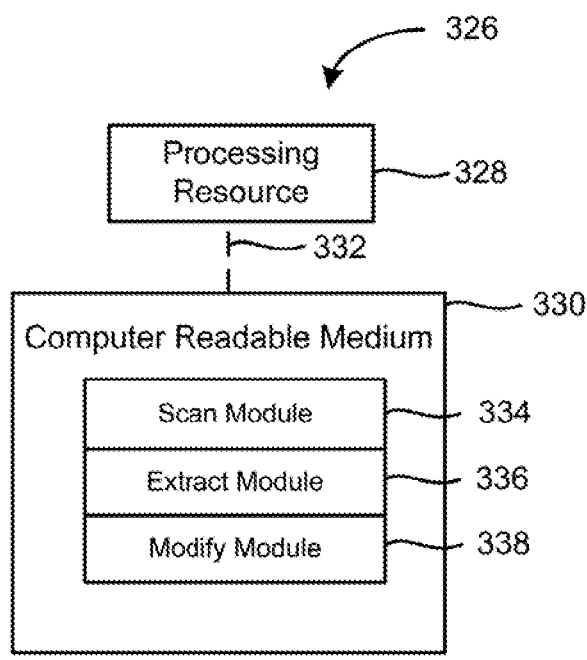
FIG. 3 illustrates a diagram of an example of a computing device for providing interactive optical codes according to the present disclosure.

FIG. 3 illustrates a diagram of an example of a computing device for providing resources to customers according to the present disclosure. The computing device 326 can utilize software, hardware, firmware, and/or logic to perform a number of functions described herein.

The computing device 326 can be a combination of hardware and instructions to share information. The hardware, for example can include a processing resource 328 and/or a memory resource 330 (e.g., computer readable medium (CRM), database, etc.). A processing resource 328, as used herein, can include a number of processors capable of executing instructions stored by a memory resource 330. Processing resource 328 can be integrated in a single device or distributed across multiple devices. The instructions (e.g., computer-readable instructions (CRI)) can include instructions stored on the memory resource 330 and executable by the processing resource 328 to implement a particular function (e.g., providing resources to customers, etc.).

The memory resource 330 can be in communication with the processing resource 328. A memory resource 330, as used herein, can include a number of memory components capable of storing instructions that can be executed by processing resource 328. Such a memory resource 330 can be a non-transitory CRM. The memory resource 330 can be integrated in a single device or distributed across multiple devices. Further, the memory resource 330 can be fully or partially integrated in the same device as the processing resource 328 or it can be separate but accessible to that device and the processing resource 328. Thus, it is noted that the computing device 326 can be implemented on a user device and/or a collection of user devices, on a mobile device and/or a collection of mobile devices, and/or on a combination of the user devices and the mobile devices.

The memory resource 330 can be in communication with the processing resource 328 via a communication link 332 (e.g., path). The communication link 332 can be local or remote to a computing device associated with the processing resource 328. Examples of a local communication link 332 can include an electronic bus internal to a computing device where the memory resource 330 is one of a volatile, non-volatile, fixed, and/or removable storage medium in communication with the processing resource 328 via the electronic bus.

The memory resource 330 can include a number of modules such as a scan module 334, extract module 336, and modify module 338. The number of modules 334, 336, 338 can include CRI that when executed by the processing resource 328 can perform a number of functions. The number of modules 334, 336, 338 can be sub-modules of other modules. For example, the scan module 334 and the extract module 336 can be sub-modules and/or contained within the same computing device. In another example, the number of modules 334, 336, 338 can comprise individual modules at separate and distinct locations (e.g., CRM, etc.).

Each of the number of modules 334, 336, 338 can include instructions that when executed by the processing resource 328 can function as a corresponding engine as described herein. In another example, the scan module 334 can include instructions that when executed by the processing resource 328 can function as the image capture engine 318. For example, the scan module 334 can include CRI that when executed by the processing resource 328 can scan an optical code and a character surrounding the optical code.

Figure 4:
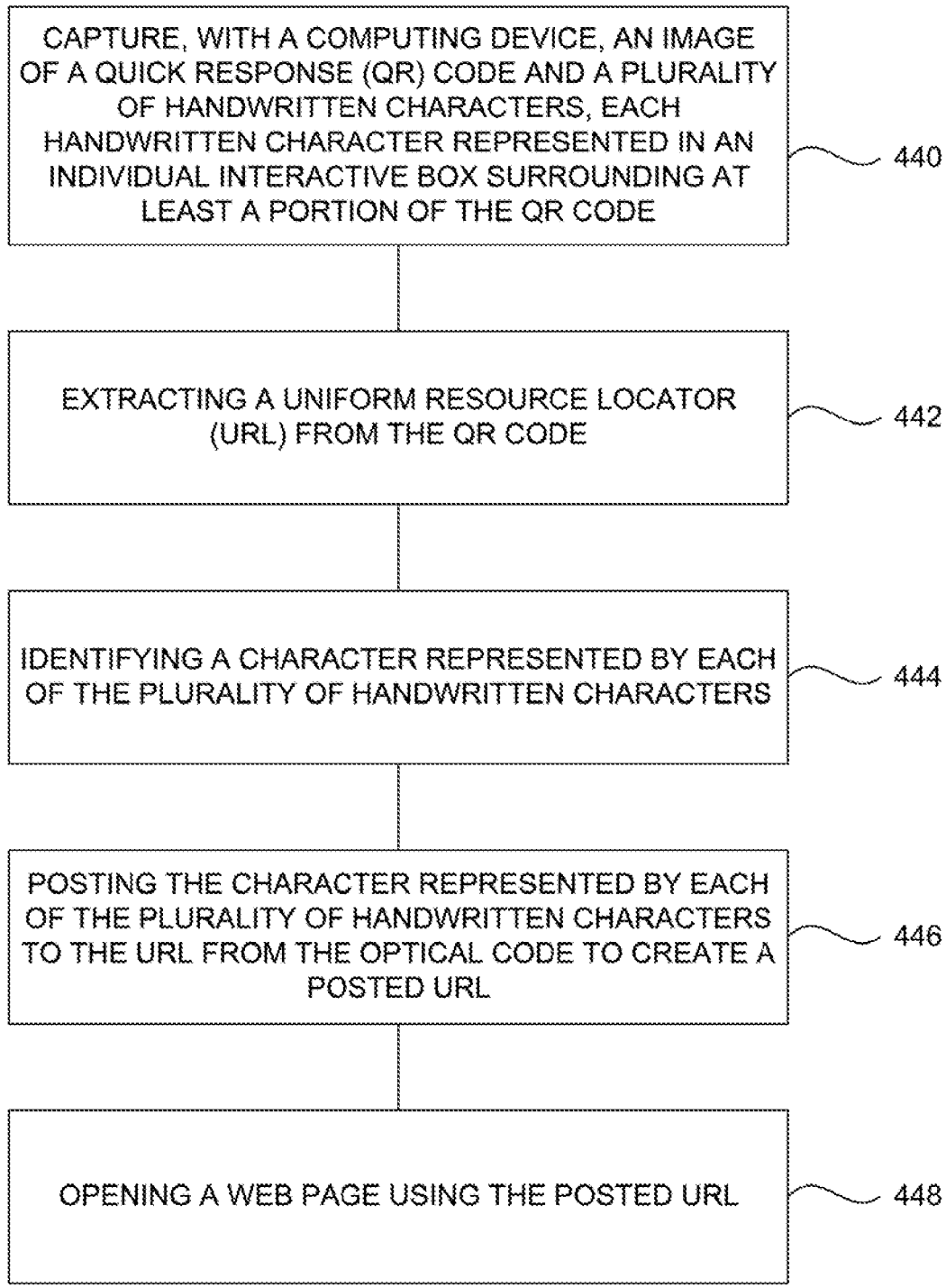
FIG. 4 illustrates a flow diagram of an example of a method for providing interactive optical codes according to the present disclosure.

FIG. 4 illustrates a flow diagram of an example of a method for providing interactive optical codes. The method can include capturing 440, with a computing device, an image of a QR code and a plurality of handwritten characters, each handwritten character represented in an individual interactive box surrounding at least a portion of the QR code. In some examples, the QR code can include a URL and the plurality of characters can contain information associated with a particular portion of a web site associated with the URL.

The method can include extracting 442 a URL from the OR code, Extracting the URL from the QR code can be accomplished through use of an optical code processing library. In some examples, the information (e.g., URL) associated with the QR code can be included in the optical code processing library and associated with the QR code. The QR code can be searched for in the library and the information associated with the OR code can be determined.

The method can include identifying 444 a character represented by each of the plurality of handwritten characters. Examples of the present disclosure can use OCR to identify the characters associated with each of the plurality of handwritten characters. In some examples, each of the plurality of handwritten characters can be related to a different content. As discussed herein, each of the characters can be associated with a rating of a service, article, etc. and individual characters can represent different types of ratings, such as ratings associated with a content, clarity, grammar, and/or articulation associated with an article.

Alternatively, the plurality of handwritten characters can be related to a same content. As discussed herein, multiple characters can be associated with a product, location, etc. and can represent a name of the product, a zip code associated with the location and/or a city name associated with the location, on some examples.

The method can include posting 446 the character represented by each of the plurality of handwritten characters to the URL from the optical code to create a posted URL. In some examples, the character represented by each of the plurality of handwritten characters can be sent as a representation of new data to a server responsible for opening a web page associated with the URL. The representation of new data can be sent with the URL to the server responsible for opening the web page, before the URL is sent to the server responsible for opening the web page, and/or after the URL is sent to the server responsible for opening the web page.

In some examples, the URL can be associated with a general landing page of a web site, and the representation of new data can be associated with a particular portion of the web site that is different than the general landing page. For example, the representation of new data can be associated with a particular product page, whereas the URL can be associated with a general product page that includes all products. Alternatively, the representation of new data can be associated with information that can be entered into fields on a web page associated with the URL. For example, contact information associated with a user can be represented by the representation of new data and can be entered into fields included in a web page associated with the URL.

The method can include opening 448 a web page using the posted URL. As discussed herein, the character represented by each of the plurality of handwritten characters can be used to generate a more specific URL. In some examples, the URL can represent a general landing page of a web site and the character represented by each of the plurality of handwritten characters can be associated with a particular page of the web site.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

As used herein, "a" or "a number of" something can refer to one or more such things. For example, "a number of widgets" can refer to one or more widgets.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A non-transitory computer-readable medium storing instructions executable by a computer to:
    scan an optical code having an optical code portion and an interactive portion; and
    modifying the interactive portion of the optical code by adding content to the interactive portion associated with information represented in the optical code portion, wherein the content added to the interactive portion includes a plurality symbols, alphanumeric characters, or symbols and alphanumeric characters,
    wherein the interactive portion includes a plurality of cells or includes a space between the optical code portion and a line surrounding the optical code portion.

2. The medium of claim 1, wherein the instructions are further executable to scan the content added to the interactive portion of the optical code.

3. The medium of claim 2, wherein at least one character among the content added to the interactive portion is associated with a first set of information, and wherein at least one different character among the content added to the interactive portion is associated with a second set of information.

4. The medium of claim 2, wherein at least one of the content added to the interactive portion is handwritten, and wherein the instructions are further executable to determine at least one handwritten symbol or alphanumeric character from the content through optical character recognition.

5. The medium of claim 4, wherein the instructions are further executable to associate the determined at least one handwritten symbol or alphanumeric character with a uniform resource locator (URL) in the optical code.

6. The medium of claim 1, wherein the plurality of cells surround at least a portion of a side of the optical code.

7. The medium of claim 1, wherein the information represented in the optical code portion includes a uniform resource locator (URL), and the content added to the interactive portion of the optical code is a subordinate of a resource identified by the URL.

8. The medium of claim 7, including instructions executable to send the added content as a post parameter with the URL from the optical code to a web browser.

9. The medium of claim 8, including instructions to launch a web page associated with the post parameter and the URL.

10. The medium of claim 7, including instructions to extract the URL from the optical code using a processing library remote from the computer.

11. The medium of claim 7, wherein the URL is for a landing page of a web site that includes a field to enter information, the instructions executable to include entering the content of the interactive portion within the website field.

12. The medium of claim 1, wherein the added content includes a rating of information represented in the optical code portion.

13. The medium of claim 12, wherein the information is at least one of a product and service, and wherein the rating of information is a quality score of the at least one product and service.

14. A system comprising:
    a processing resource; and
    a non-transitory computer readable medium in communication with the processing resource having instructions stored thereon that, when executed by the processing resource, cause the processing resource to:
        capture an image of an optical code and a plurality of characters in an interactive portion of the optical code, wherein the plurality of characters includes symbols, alphanumeric characters, or symbols and alphanumeric characters,
        extract a URL from an optical code portion of the optical code, and
        post the plurality of characters to the URL from the optical code to create a posted URL,
    wherein the interactive portion includes a plurality of cells each for storing a character of the plurality of characters, or includes a space between the optical code and a line surrounding the optical code.

15. The system of claim 14, including instructions to open a web page using the posted URL.

16. The system of claim 14, including instructions to open a web page that is specific to content represented by the plurality of characters.

17. The system of claim 14, wherein the plurality of characters includes a handwritten character, and the instructions further cause the processing resource to apply optical character recognition to the handwritten character to capture the plurality of characters.

18. A method, comprising:
   capturing, with a computing device, an image of a quick response (QR) code and a plurality of characters, each character represented in an interactive box surrounding at least a portion of the QR code;
   extracting a uniform resource locator (URL) from the QR code;
   scanning the plurality of characters;
   posting at least one of the characters represented by each of the plurality of characters to the URL from the QR code to create a posted URL; and
   opening a web page using the posted URL, including opening a general landing page of a web site using the posted URL and opening a particular page associated with the web site using a character of the plurality of characters.

19. The method of claim 18, wherein the plurality of characters includes a handwritten character, and the scanning the plurality of characters includes applying optical character recognition to the handwritten character.

* * * * *